Nov. 21, 1950 E. H. HUGENHOLTZ 2,530,614

TRANSMITTER AND RECEIVER FOR SINGLE-SIDEBAND SIGNALS

Filed July 20, 1946 2 Sheets-Sheet 1

INVENTOR.
EDUARD HERMAN HUGENHOLTZ

BY Fred M. Vogel

AGENT

INVENTOR.
EDUARD HERMAN HUGENHOLZ
BY Fred M. Vogel
AGENT

Patented Nov. 21, 1950

2,530,614

UNITED STATES PATENT OFFICE 2,530,614

TRANSMITTER AND RECEIVER FOR SINGLE-SIDEBAND SIGNALS

Eduard Herman Hugenholtz, Eindhoven, Netherlands, assignor to Hartford National Bank and Trust Company, Hartford, Conn., as trustee Application July 20, 1946, Serial No. 685,122
In the Netherlands October 21, 1943

Section 1, Public Law 690, August 8, 1946
Patent expires October 21, 1963

6 Claims. (Cl. 250—6)

Figure 1:
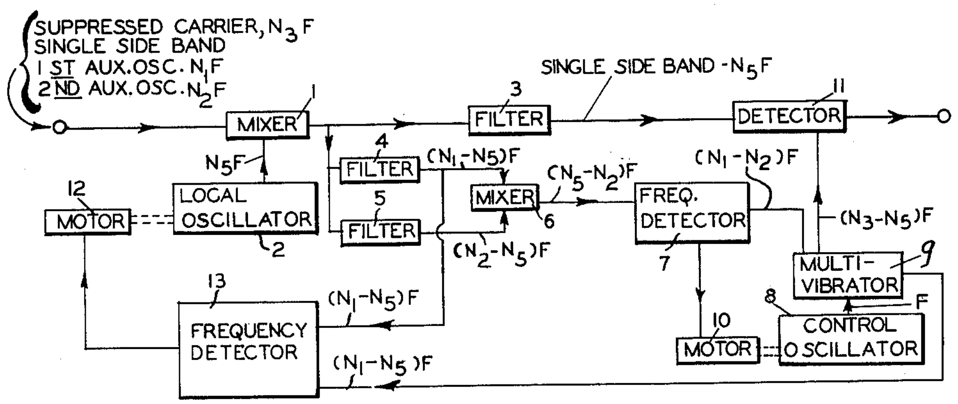

This invention relates to a transmitter for the transmission of one-sideband signals with suppressed carrier wave and for the simultaneous transmission of one or more, preferably two, auxiliary oscillations and to a receiver for the reception of such one-sideband signals.

In transmissions of carrier waves modulated in amplitude, it is known to cut off the carrier wave and one of the sidebands, so that the transmitter only sends out a signal consisting of one sideband. In order to facilitate the detection of this one-sideband signal at the receiver, one or more auxiliary oscillations are, as a rule, transmitted simultaneously with the signal, for the carrier wave to be utilized for the detection must be locally generated in the receiver, so that particular steps have to be taken to prevent that any change of the frequency of the (suppressed) carrier wave in the transmitter or of the locally generated carrier wave in the receiver has a harmful influence on the satisfactory reception of the signal or even makes such a reception quite impossible. It is possible now to control the frequency of the locally generated carrier wave with the aid of one or more auxiliary oscillations transmitted simultaneously with the signal. However, by means of such a control the frequency of the locally generated carrier wave can in general be made only approximately equal to that of the suppressed carrier wave of the transmitter.

The invention provides means with which the complete or substantially complete synchronism of the locally generated carrier wave and the suppressed carrier wave of the transmitter is obtained in a simple manner.

For to that end one or more (or two or more), and preferably two, auxiliary oscillations are sent out simultaneously with the one-sideband signal. These auxiliary oscillations are chosen in such manner that between the frequencies of these oscillations and of the suppressed carrier wave itself (or between the mutual differences of these frequencies respectively), there exist fixed ratios which are independent of the frequency variation of the transmitter.

This can very easily be achieved by deriving the frequencies of the auxiliary oscillations and of the suppressed carrier wave from a common fundamental frequency. Between the frequencies of the auxiliary oscillations and of the suppressed carrier wave there exist in this case fixed ratios which are independent of the variation of the transmitter. It is also possible, however, to obtain the frequencies of the auxiliary oscillations and the frequency of the suppressed carrier wave, for example, by means of frequency-transformation, from oscillations derived from a common fundamental frequency, in which event there exist between the mutual differences of these frequencies fixed ratios which are independent of the variation of the transmitter. When changing-over the transmitter to another wavelength also other ratios are, in general chosen in the first case, since due to the changing-over the mutual frequency differences are modified; in the second case—assuming that a constant bandwith of the signal is desired—this is not necessary since in this case the mutual frequency differences are independent of the chosen wavelength of the transmitter. As a rule it is not necessary that the said fundamental frequency should remain exactly constant; even upon variation of this frequency there subsist notwithstanding fixed ratios between the frequencies of the auxiliary oscillations and of the carrier wave or between the mutual differences of these frequencies.

Preferably two auxiliary oscillations are transmitted simultaneously with the signal, the frequency of the one auxiliary oscillation being located at a determined distance (for example 1 kc./s. above and the frequency of the other auxiliary oscillation being located at a determined (for example equal) distance below the frequency band of the signal.

The fixed ratios existing, according to the invention, between the frequencies of the auxiliary oscillations and of the carrier wave, or between the mutual differences of these frequencies make it now possible to construct a receiver which is suitable for the reception of the desired one-sideband signals and with which the correct position of the locally generated carrier wave to be used for the detection with respect to the frequency band of the received signal is guaranteed in a simple manner.

In the more general case, in which two or more than two auxiliary oscillations are transferred and in which there exist fixed ratios between the mutual differences of the frequencies of the auxiliary oscillations and of the suppressed carrier wave, this correct position is obtained with the aid of oscillations generated by a control oscillator and by means of at least one frequency-transformation stage included in the receiving channel, the control oscillator being regulated dependently on the differential frequency of at least two auxiliary oscillations in such a manner that between the frequency of this oscillator and the said mutual frequency differences there always exist fixed ratios independent or substantially independent of the frequency variation of the receiver and the frequency of the oscillations with which the transformation is effected in the frequency-transformation stage, being regulated with the aid of or being determined by the frequency difference between an oscillation derived from an auxiliary oscillation and an oscillation derived from the control oscillator.

Let us assume that, according to the invention, in a transmitter three oscillations $f_1$, $f_2$ and $f_3$ are derived as higher harmonics from a common fundamental frequency $f$: $f_1=n_1f$, $f_2=n_2f$ and $f_3=n_3f$; from $f_1$ and $f_2$ are derived by frequency transformation the two auxiliary oscillations $(f_1+s)$ and $(f_2+s)$, $s$ representing the frequency with which the transformation is effected. The frequency $f_3$ acts as an auxiliary carrier wave and is suppressed later on, so that the frequency $(f_3+s)$ i. e. the frequency of the suppressed carrier wave, is not transmitted.

It appears directly from the above that between the mutual frequency differences of the two auxiliary oscillations and the suppressed carrier wave there exist fixed ratios independent of the variation of the transmitter. Now the frequency band of the signal is transmitted jointly with the two auxiliary oscillations (located, for example on either side of this frequency band) by the transmitter and received by the receiver. At the receiver there arises the problem of giving the carrier wave to be locally generated the right position with respect to the frequency band of the received signal. As stated above this is achieved, according to the invention, with the aid of a control oscillator and a frequency-transformation stage, since the receiver is equipped with an oscillator (control oscillator) whose frequency is regulated dependently on the differential frequency of the two auxiliary oscillations. i. e. dependently on $f_1-f_2=(n_1-n_2)f$. As appears from the above formula, there exists a fixed ratio. independent of the variation of the transmitter and the receiver between the said frequency difference and the common fundamental frequency $f$. The control oscillator is now regulated in such a manner that such a fixed ratio also exists between its frequency and the common fundamental frequency $f$. Let us assume for the sake of simplicity, that the frequency of the control oscillator is made equal to the fundamental frequency $f$, then the higher harmonics $f_1$, $f_2$ and $f_3$ can immediately be produced in the receiver.

In order to obtain the correct frequency of the carrier wave to be locally generated a frequency-transformation stage is used. According to the invention, the integral received signal inclusive of the two auxiliary oscillations may now be transformed in frequency, for example, in the receiver with the aid of a frequency $t$ originating from a (first) local auxiliary oscillator. The frequency $t$ is regulated dependently on the difference in frequency between one of the auxiliary oscillations transformed in frequency, for example $(f_1+s-t)$ and a frequency originating from the control oscillator (for example $f_1$), i. e. dependently on the frequency difference $(s-t)$. The regulation of the frequency $t$ may be effected, for example, in such a manner that the frequency difference $(s-t)$ becomes equal to zero. In this case the frequency $f_3$ derived from the control oscillator $f_3$ may directly be used as a carrier wave for the demodulation of the signal.

The above-described method is not the only method which permits to obtain the carrier wave to be locally generated. Thus, for example, the aforesaid frequency transformation may be applied to $f_1$ and $f_3$ by mixing them with the frequency $t$ and by regulating subsequently this frequency dependently on the difference between the frequency $(s+f_1)$—the first auxiliary oscillation of the received signal—and the frequency $(t+f_1)$—the oscillation $f_1$ transformed in frequency and derived from the control oscillator.

It is also possible to apply the frequency transformation to $f_3$ by mixing this frequency with the frequency difference $s$ which exists between the first auxiliary oscillation $(s+f_1)$ and the frequency $f_1$ locally generated in the control oscillator; the frequency $(s+f_3)$ may be used in this case as the carrier wave.

It is also possible to utilize several frequency transformations, for example, combinations of the transformations set out hereinbefore, whilst in the forms of construction described hereinafter by way of example a few further possibilities of construction will be given.

A particular case presents itself if between the frequencies of the auxiliary oscillations and of the suppressed carrier wave itself there exist fixed ratios independent of the variation of the transmitter. This case, which may be considered as a special form of realization of the above-described general case, may be realized, for example, by effecting the frequency transformation in the transmitter with the aid of a frequency $s$, which is derived from the common fundamental frequency $f$, i. e. by taking $s$ equal to $nf$. It is sometimes also possible to take $s=0$ and directly to transmit the frequencies $f_1$, $f_2$ and the frequency band of the signal.

All that has been said hereinbefore for the general case can be applied to this particular case; it exhibits, however, moreover, some particular properties, owing to which several of the above-mentioned steps necessary for the general case, may sometimes be suppressed.

For in the particular case it is not absolutely necessary to transmit two or more than two auxiliary oscillations; frequently one auxiliary oscillation is frequently sufficient. Dependently on this auxiliary oscillation, between whose frequency and the frequency of the suppressed carrier wave there exists a fixed ratio, the frequency of the control oscillator may be regulated in such a manner that a fixed ratio will also be obtained between the said frequency and the frequency of the suppressed carrier wave.

The use of a frequency-transformation stage has thus also become superfluous since now the carrier wave to be locally generated can be derived either directly or after a suitably chosen frequency-division and/or frequency-multiplication from the control oscillator. Nevertheless, it is sometimes advisable to use a frequency-transformation stage in the receiving channel, in which event the signal may effectively be transformed in frequency with the aid of a frequency $t$ derived from the control oscillator. Since there exists a fixed ratio between the frequency $t$ and the fundamental frequency $f$, there subsists, also after this frequency-transformation, a fixed ratio between the frequency of the frequency-transformed oscillation of the signal and the frequency of the suppressed carrier wave. Consequently the control oscillator can still be regulated with the aid of the auxiliary oscillation transformed in frequency.

With the use of the particular case a considerably simplified equipment consequently frequently suffices. On the other hand, if use is made of only one auxiliary oscillation it is in practice sometimes more difficult to change over to a wavelength different from that once adjusted, since we are bound once for all to a determined range of wavelengths; such is not the case if use is made of frequency transformation with an arbitrary frequency $s$ in the transmitter, or $t$ in the receiver. However, when transforming with arbitrary frequencies $s$, or $t$, use must be made of at least two auxiliary oscillations and then we have again the previously mentioned general case.

If use is made of a frequency transformation stage in which the frequency transformation is effected by means of oscillations generated by a (first) local auxiliary oscillator, it is possible to generate the carrier wave to be used for the detection with the aid of a (second) local auxiliary oscillator which operates independently of the control oscillator and which consequently is not controlled by the control oscillator. In this case, however, the frequency of the first auxiliary oscillation must be regulated, in addition, dependently on the frequency of the second local auxiliary oscillation. This is efficiently effected by means of a frequency detector in which a voltage originating from at least one of the auxiliary oscillations of the signal is compared with a voltage which is derived both from the control oscillator and from the second local auxiliary oscillator.

As has been said hereinbefore, the invention may also be applied in those cases in which more than one frequency transformation stage is used. If, in this case, a separate auxiliary oscillator is used in each stage, it suffices, as a rule, to regulate only one of these auxiliary oscillators in any of the above-mentioned ways.

In order that the invention may be clearly understood and readily carried into effect, it will now be explained more fully with reference to the accompanying drawing, in which three forms of construction are represented by way of example.

Figure 2:
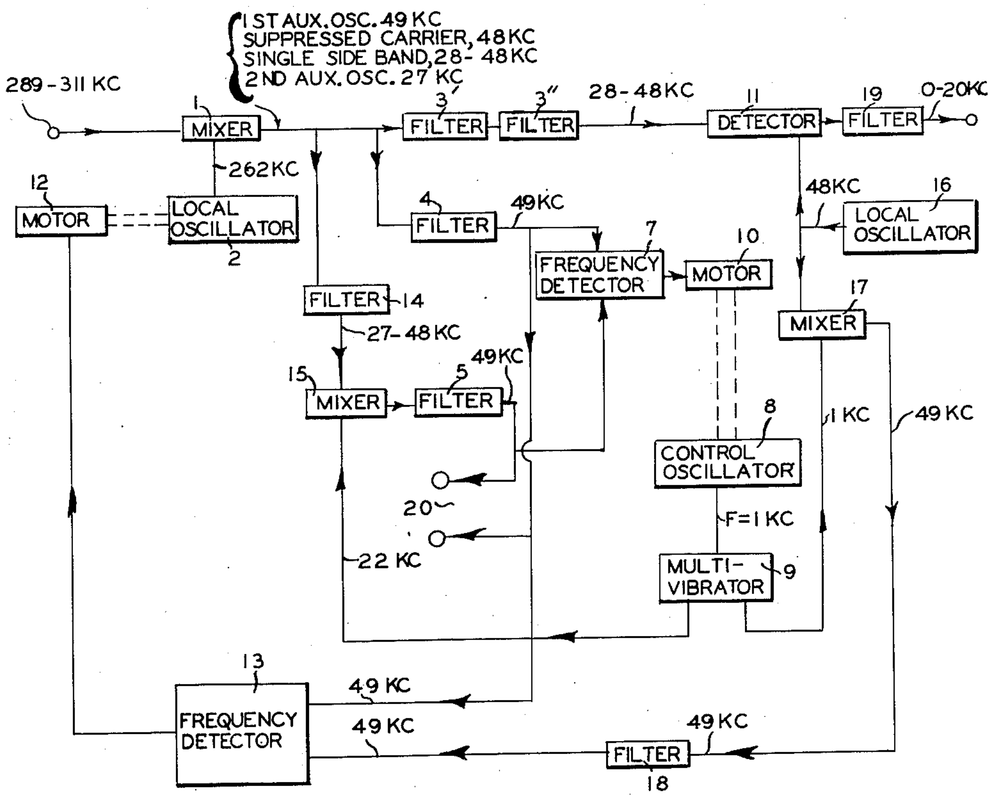
Figure 3:
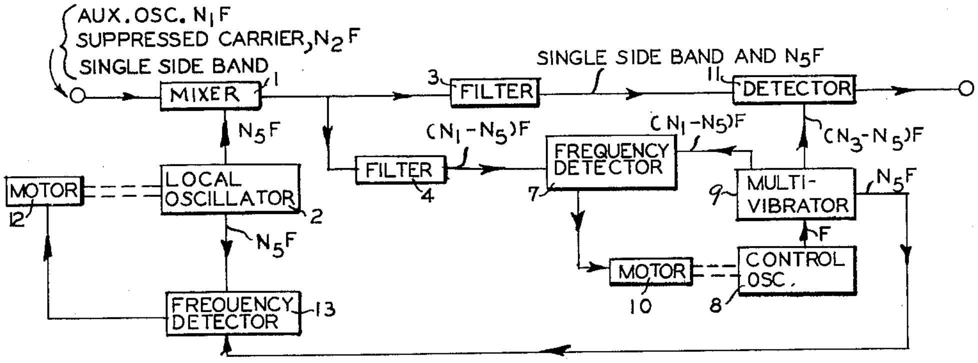
Figure 4:
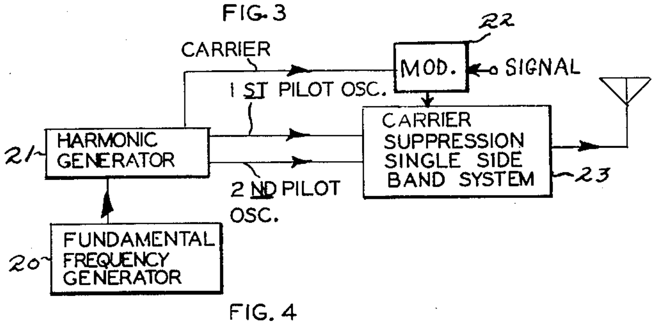
Figure 5:
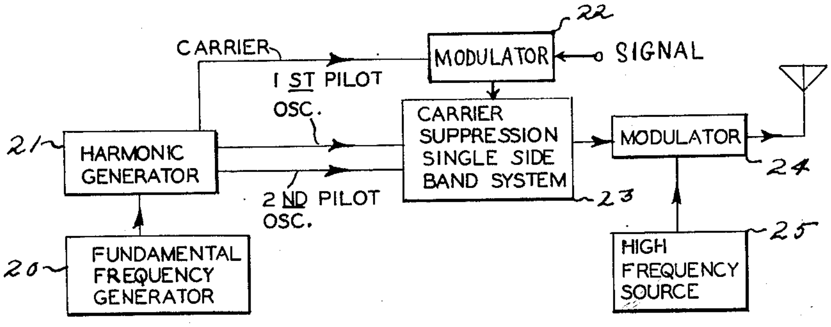

Fig. 1 is a block diagram of the mixer and detector stages of a receiver according to the invention, Fig. 2 is a block diagram of another preferred embodiment of a receiver, Fig. 3 is a block diagram of still another preferred embodiment of a receiver, Fig. 4 is a block diagram of a transmitter arrangement according to the invention, and Fig. 5 is a block diagram of another transmitter arrangement according to the invention.

Fig. 1 represents diagrammatically the intermediate-frequency stage and the detection stage of a receiver suitable for the reception of one-sideband signals with suppressed carrier wave, two auxiliary oscillations being transmitted simultaneously with these signals. According to the invention, the frequencies of the two auxiliary oscillations and the frequency of the suppressed carrier wave are derived in a transmitter from a common fundamental frequency, so that between these frequencies there exist fixed ratios which are independent of the variation of the transmitter. The local oscillations generated in a local auxiliary oscillator 2 and serving for the frequency transformation are mixed in the intermediate-frequency stage 1 of the receiver with the received and, as the case may be, high-frequency-amplified signal. After being amplified, if required, the intermediate-frequency signal is supplied to three electric filters 3, 4 and 5. The filter 3 allows only the frequency transformed modulation of the suppressed carrier wave to pass and prevents the passage of the two frequency transformed auxiliary oscillations; the filters 4 and 5 sift out exclusively the one and exclusively the other frequency transformed auxiliary oscillation respectively. The auxiliary oscillations thus obtained are supplied to a mixing stage 6, at whose terminals appears an oscillation whose frequency is equal to the difference between the frequencies of the two auxiliary oscillations. This oscillation is supplied to a frequency detector 7.

In an oscillator 8 (control oscillator) is generated an oscillation with the aid of which a multivibrator 9 is controlled. This multivibrator generates the higher harmonics of the oscillation generated by the control oscillator. One of these higher harmonics is now also supplied to the frequency detector 7. In choosing these higher harmonics we proceed as follows. The frequencies of the auxiliary oscillations (and also the frequency of the suppressed carrier wave) of the signal are derived from a determined fundamental frequency $f$. The frequencies of the received auxiliary oscillations may consequently be represented by $n_1f$ and $n_2f$ respectively, whilst their difference is $(n_1-n_2).f$. After the said frequency transformation, the absolute values of the frequencies of the auxiliary oscillations have changed, it is true, but their difference has remained equal to $(n_1-n_2)f$. Now the frequency of the control oscillator 8 is made equal to $f$ as exactly as possible and the $(n_1-n_2)th$ harmonic of this oscillator—which harmonic is generated by the multivibrator 9—is compared in the frequency detector 7 with the frequency difference of the auxiliary oscillations.

The frequency detector furnishes a control voltage which is dependent upon the difference in frequency between the two frequencies to be compared. This control voltage controls a motor 10 which regulates the tuning frequency of the control oscillator. Owing to this regulation the frequency of the control oscillator is made equal, either exactly or within a very small amount, and also continuously kept equal to the fundamental frequency $f$ of the transmitter.

In the supposed case the suppressed carrier wave of the transmitter was a higher harmonic of this fundamental frequency; therefore, if at least no frequency transformation of the signal would have taken place, it would also be necessary to utilize in the receiver the corresponding higher harmonic of the control oscillator as the local carrier wave. However, now that frequency transformation of the signal has taken place, it is, of course, also necessary to utilize a local carrier wave of other frequency. However, as such may be utilized again a suitably chosen higher harmonic of the control oscillator 8, provided that the frequency of the local auxiliary oscillator 2 should satisfy a determined condition which will be set out hereinafter.

Owing to the frequency transformation there exists no longer a fixed ratio between the frequency of the control oscillator and that of the (suppressed) frequency-transformed carrier wave of the signal. The frequency of the carrier wave not transformed in frequency may be represented by $n_3f$ where $f$ designates again the fundamental frequency of the transmitter. If the frequency of the auxiliary oscillator 2 is represented by $t$, the suppressed, frequency-transformed carrier wave amounts to $(n_3f \pm t)$ and, as a rule, there does not exist a fixed ratio between this frequency and the frequency $f$ of the control oscillator 8 or the frequency of any of the higher harmonics of this oscillator (which, in general can be represented by $n_4f$).

However, if the frequency of the auxiliary oscillator 2 is chosen in such a manner that $t$ is a multiple of the frequency $f$, $(t = n_5f)$, the fixed ratio is re-established since in that case also the suppressed, frequency-transformed carrier wave has a frequency which is a multiple of the frequency $f$, for in this case this frequency amounts to $(n_3f \pm t) = (n_3f \pm n_5f) = f(n_3 \pm n_5)$. In this case the auxiliary oscillation required for the frequency transformation might be derived directly from the control oscillator 8 or from the multivibrator 9, in which event consequently $n_4f = f(n_3 \pm n_5)$ or $n_4 = n_3 \pm n_5$. As a rule it is necessary in this case to use frequency multiplication several times. In the circuit-arrangement represented in the figure this is however avoided as follows:

The auxiliary oscillator 2 is tuned as exactly as possible to a frequency which satisfies the said condition and then the correct value of this frequency is automatically adjusted with the aid of a motor 12 which is controlled by the output voltage of a frequency detector 13. In this frequency detector two frequencies are compared with one another, viz. the frequency of one of the frequency-transformed auxiliary oscillations and the frequency of that higher harmonic of the control oscillator which approaches nearest the first-mentioned frequency. By the regulation the frequency of the auxiliary oscillator 2 is adjusted in such a manner that the frequencies compared in the frequency detector 13 become equal or substantially equal to one another, that is to say that the frequency of one of the frequency-transformed auxiliary oscillations and therefore also the frequency of the suppressed, frequency-transformed carrier wave become equal to a harmonic of the control oscillator (i. e. to a multiple of the frequency $f$), so that the condition to be fulfilled is complied with.

The local carrier wave, which is now supplied by the multivibrator 9 as a higher harmonic of the control oscillator, is mixed in the detector 11 with the signal freed from the auxiliary oscillations by the filter 3, with the result that the signal is detected. The low-frequency oscillations thus obtained are subsequently amplified in a low-frequency amplifier (not shown).

If the detected signal comprises a plurality of channels, the demodulation frequencies of these channels may be derived from the control oscillator 8 or from the multivibrator 9, at least if in the transmitter, the corresponding carrier waves of these channels are derived from the fundamental frequency of the transmitter.

Fig. 2 represents a receiver similar to that of Fig. 1. However, this receiver is suitable for the reception of one-sideband signals emitted by a transmitter, wherein the frequencies of the auxiliary oscillations and the frequency of the suppressed carrier wave are obtained by means of a frequency transformation, from oscillations derived from one common fundamental frequency. In the example present this fundamental frequency amounts to 1 kc./s., wherein the oscillations derived from this fundamental frequency have a frequency of 49, 48 and 27 kc./s. The frequency of 48 kc./s. serves as the auxiliary carrier wave and the two other frequencies serve for the derivation of the auxiliary oscillations. The frequency band of the signal extends from 28 to 48 kc./s.; the whole of the signal is transmitted on short waves and is then received by the receiver.

In the receiver the high-frequency signal is converted, as the case may be, after being amplified, in the usual manner into an intermediate-frequency signal (289–311 kc./s.). Now the intermediate-frequency signal is mixed in the mixing stage 1 in the same manner as in the example according to Fig. 1, with the oscillations originating from the auxiliary oscillator 2. The frequency of the auxiliary oscillator 2 is so chosen that the frequency-transformed signal extends again from 27 to 49 kc./s. (modulation width of the signal from 28 to 48 kc./s., frequency-transformed auxiliary oscillations 27 and 49 kc./s., frequency-transformed, suppressed carrier wave 48 kc./s.).

The frequency-transformed signal is freed from the two auxiliary oscillations by two filters 3′ and 3″. The filter 3′ passes all oscillations having a frequency of less than 48 kc./s. and the filter 3″ passes all frequencies having a frequency of more than 28 kc./s. Furthermore, the signal is supplied to two filters 4 and 14; the filter 4 passes only the (first) auxiliary oscillation whose frequency is 49 kc./s. and the filter 14 passes all oscillations of the signal, except the first auxiliary oscillation. The signal, in which the first auxiliary oscillation is suppressed by the filter 14, is mixed in the mixing stage 15 with the 22nd harmonic of the control oscillator 8 (the frequency of the control oscillator is 1 kc./s.; the various harmonics are furnished by the multivibrator 9); the combination of this 22nd harmonic with the second auxiliary oscillation still present in the signal (27 kc./s.) yields again a frequency of 49 kc./s. which is sifted out by the filter 5. When use is made of the above-described combination of the filter 14 and the mixing stage 1, it is only necessary to switchover a small number of filters when the bandwidth of the transmitter is modified. This modification of the bandwidth may effectively be brought about by shifting the frequency of one of the auxiliary oscillations.

Now the oscillations passed by the filters 4 and 5 are compared with one another in the frequency detector 7. The outward voltage of this frequency detector controls in its turn the motor 10 and the latter regulates the tuning frequency of the control oscillator 8 in such manner that the frequencies of the two oscillations supplied to the frequency detector are made equal to one another. In reality, here again as in the first form of construction given by way of example, the frequency difference of the two auxiliary oscillations is made equal to a suitably chosen higher harmonic of the control oscillator 8.

In this case, however, the local carrier wave is not taken from the control oscillator, but is generated by a (second) local auxiliary oscillator 16 (48 kc./s.) which operates independently of this oscillator. This auxiliary oscillator is introduced in order to be able to avoid the generation of very high harmonics by the multivibrator 9. Now it is necessary that the frequency of the first local auxiliary oscillator 2 should be regulated, in addition, dependently on the frequency of the second local auxiliary oscillator 16. For this purpose the oscillation generated by the auxiliary oscillator 16 (48 kc./s.) is mixed in a mixing stage 17 with the frequency of the control oscillator 8 (1 kc./s.). The frequency of 49 kc./s. which appears after mixing is supplied through a filter 18 which only passes this frequency, to the frequency detector 13 wherein it is compared with the first auxiliary oscillation (49 kc./s.). The frequency detector 13 regulates again in the previously described manner the tuning frequency of the auxiliary oscillator 2 through the intermediary of the motor 12. The correct position of the locally generated carrier wave with respect to the frequency band of the received signal is thus ensured. In the detector 11 the local carrier wave is mixed with the signal freed from the auxiliary oscillations, whereupon the developed low-frequency oscillations are transferred via a filter 19 which passes all oscillations of a frequency of less than 20 kc./s., to a low-frequency amplifier (not shown).

The amplification of the receiver may advantageously be automatically controlled dependently on the intensity with which at least two auxiliary oscillations are received. In the circuit-arrangement in question, for example, the control voltage for the automatic control of the amplification may be generated with the aid of oscillations which the filters 4 and 5 allow to pass. The connecting terminals from which these oscillations may be taken are designated in the figure by 20.

Finally Fig. 3 represents a receiver suitable for the reception of one-sideband signals with suppressed carrier wave, only one auxiliary oscillation being transmitted simultaneously with the said signal. As in the form of construction according to Fig. 1 the frequency of the auxiliary oscillation and the frequency of the suppressed carrier wave are derived in the transmitter of these one-sideband signals from a common fundamental frequency. The circuit-arrangement corresponds, except in some details, with the circuit-arrangement shown in Fig. 1. Here, however, the auxiliary oscillation transformed in frequency is directly compared in the frequency detector 7 with an oscillation originating from the control oscillator 8, whilst in the frequency detector 13 the oscillation furnished by the local auxiliary oscillator 2 is compared with a suitably chosen higher harmonic of the oscillation generated by the control oscillator 8. By means of the frequency detector 13 the frequency of the local auxiliary oscillation is made equal to the frequency of the said higher harmonic, so that now there exists again a fixed ratio between the frequency of the local auxiliary oscillation and the said common fundamental frequency.

The receiver according to Fig. 3 offers with respect to the receiver according to Fig. 2 the advantage of a considerably simplified circuit-arrangement but, on the other hand, it is not possible to switch over directly to any desired wave length.

The invention offers the advantage that the use of very stable oscillators is unnecessary and that upon modification of the frequency band of the signal only a small number of elements has to be exchanged.

Referring now to Fig. 4 there is shown schematically one embodiment of a transmitter according to the invention wherein a fundamental frequency generator 20 is provided to excite a harmonic generator 21 from which is derived the carrier wave and the first and second pilot oscillations. The carrier wave is modulated by the signal to be transmitted in a modulator 22 of any conventional design, and the modulated carrier as well as the first and second pilot oscillations are applied to a carrier suppression single side band system 23 so that but one side band of the modulated carrier is transmitted in addition to the first and second pilot oscillations. It will be evident that since the carrier and the pilot oscillations are harmonically related and are derived from a common source there will exist a fixed ratio therebetween, which ratio is undisturbed by fluctuations in the fundamental frequency of the common source. The transmitter shown in Fig. 5 is at variance with that in Fig. 4 only in that the output of the carrier suppression single side band system 23, rather than being transmitted directly, is imposed as a modulation component by means of modulator 24 on a high-frequency wave produced by source 25. Thus the relations existing between the carrier and the first and second pilot oscillations are independent of the frequency of the high frequency source 25.

The invention is of particular importance for transportable transmitters and receivers.

What I claim is:

1. Apparatus for receiving incoming energy constituted by suppressed carrier single side band signals and at least one pilot oscillation, said suppressed carrier and said pilot oscillation being derived from a common wave source whereby fixed ratios exist between the respective frequencies of said carrier and said pilot oscillation with respect to the frequency of said common source, said apparatus comprising a mixer, an adjustable local oscillator, means for applying oscillations from said local oscillator together with said incoming energy to said mixer, a detector, means for applying the single side band signals component from the output of said mixer to said detector, a local carrier source, means for applying said local carrier to said detector to effect demodulation of said signals, and means responsive to the frequency of said pilot oscillation to govern the frequency of said local oscillator to maintain the proper relation between the frequency of said local carrier and the side band signals component applied to said detector.

2. Apparatus for receiving incoming energy constituted by suppressed carrier single side band signals and first and second pilot oscillations, said suppressed carrier and said pilot oscillations being derived from a common wave source whereby fixed ratios exist between the respective frequencies of said carrier and said first and second oscillations relative to the frequency of said common source, said apparatus comprising a frequency mixer to produce intermediate frequencies, means to apply local oscillations and said incoming energy to said mixer, means to derive separately from said mixer the intermediate frequency components of said single side band signals and said first and second pilot oscillations, means to combine the intermediate frequency components of said first and second pilot oscillations to produce a beat oscillation, an adjustable control oscillator whose operating frequency is substantially equal to the frequency of said common wave source, harmonic producing means to derive from said control oscillator a carrier oscillation whose frequency is equal to the assumed intermediate frequency component of said suppressed carrier and a control oscillation whose frequency is equal to said beat oscillation, a detector, means to apply said carrier oscillation together with the intermediate frequency component of said single side band signals as an input to said detector to demodulate said signals, and means to govern the frequency of said control oscillator in accordance with a frequency difference existing between said beat oscillation and said control oscillation to maintain said oscillator in synchronism with said common wave source.

3. An arrangement as set forth in claim 2 wherein said means to govern the frequency of said control oscillator comprises a motor arranged for adjusting said oscillator, a frequency discriminator, means to apply said beat oscillation and said control oscillation to said discriminator to produce an error voltage in accordance with the frequency difference therebetween, and means to operate said motor in accordance with said error voltage.

4. Apparatus for receiving incoming energy constituted by suppressed carrier single side band signals and first and second pilot oscillations, said suppressed carrier and said pilot oscillations being derived from a common wave source whereby fixed ratios exist between the respective frequencies of said carrier and said first and second pilot oscillations relative to the frequency of said common source, said apparatus comprising a frequency mixer to produce intermediate frequencies, an adjustable local oscillator, means to apply a local oscillation from said local oscillator together with said incoming energy as an input to said mixer, means to derive separately from said mixer the intermediate frequency components of said single side band signals and said first and second pilot oscillations, means to combine the intermediate frequency components of said first and second pilot oscillations to produce a beat oscillation, an adjustable control oscillator whose operating frequency is substantially equal to the frequency of said common wave source, harmonic producing means to derive from said control oscillator a local carrier whose frequency is equal to the assumed intermediate frequency component of said suppressed carrier and a first control oscillation whose frequency is equal to the intermediate frequency component of said first pilot oscillation and a second control oscillation whose frequency is equal to said beat oscillation, means to apply said local carrier together with the intermediate frequency component of said side band signals as an input to said detector to demodulate said signals, means to govern the frequency of said control oscillator as a function of the frequency difference between said beat and said second control oscillations, and means to control the frequency of said local oscillator as a function of the frequency difference between the intermediate frequency component of said first pilot oscillation and the first control oscillation.

5. Apparatus for receiving incoming energy constituted by a high frequency wave modulated by suppressed carrier side band signals and first and second pilot oscillations, said suppressed carrier and said pilot oscillations being derived from a common wave source whereby fixed ratios exist between the respective frequencies of said carrier and said first and second pilot oscillations relative to the frequency of said common wave source, said apparatus comprising a frequency mixer, an adjustable local oscillator, means to apply a local oscillation from said local oscillator together with said incoming energy to said mixer whereby said mixer yields the modulation components of said high frequency wave, a detector, a generator producing a local carrier whose frequency is equal to said suppressed carrier, means for deriving the side band signals from the output of said mixer, means for applying said local carrier and side band signals as an input to said detector to demodulate said signals, an adjustable control oscillator whose operating frequency is substantially equal to the frequency of said common wave source, harmonic producing means for deriving from said control oscillator a first control oscillation whose frequency is equal to the difference between the frequencies of said first and second pilot oscillations and a second control oscillation equal to the difference of said local carrier and said first pilot oscillation, means to derive from said mixer said second pilot oscillation, means to combine additively said first control oscillation and said second pilot oscillation to produce a third control oscillation, means for governing the frequency of said control oscillator in accordance with the difference between said third control oscillation and said second pilot oscillation, means to combine additively said second control oscillation and said local carrier to produce a fourth control oscillation, and means to govern the frequency of said local oscillator in accordance with the frequency difference of said first pilot oscillation and said fourth control oscillation.

6. Apparatus for receiving incoming energy constituted by suppressed carrier single side band signals and a pilot oscillation, said suppressed carrier and said pilot oscillation being derived from a common wave source whereby fixed ratios exist between the respective frequencies of said carrier and said first and second oscillations relative to the frequency of said common wave source, said apparatus comprising a frequency mixer to produce intermediate frequencies, means to apply local oscillations and said incoming energy to said mixer, means to derive separately the intermediate frequency components of said single side band signals and said pilot oscillation, an adjustable control oscillator whose frequency is substantially equal to the frequency of said common wave source, harmonic producing means to derive from said oscillator a local carrier whose frequency is equal to the assumed intermediate frequency component of said suppressed carrier and a control oscillation whose frequency is equal to the intermediate frequency component of said pilot oscillation, a detector, means to apply the intermediate component of said side band signals together with said local carrier as an input to said detector to effect demodulation of said signals, and means to govern the frequency of said control oscillator in accordance with the frequency difference of said control oscillation and said intermediate frequency component of said pilot oscillation to effect synchronism of said control oscillator and said common wave source.

EDUARD HERMAN HUGENHOLTZ.

(References on following page)

REFERENCES CITED

The following references are of record in the file of this patent:

UNITED STATES PATENTS

| Number | Name | Date |
|---|---|---|
| 1,449,372 | Arnold | May 27, 1923 |
| 1,490,958 | Brown | Apr. 22, 1924 |
| 1,678,203 | Smythe | July 24, 1928 |
| 1,690,299 | Horton | Nov. 6, 1928 |
| 1,694,473 | Kendall | Dec. 11, 1928 |
| 1,797,976 | Falkner | Apr. 7, 1931 |
| 1,848,507 | Vos et al. | Mar. 8, 1932 |
| 1,885,728 | Keith | Nov. 1, 1932 |
| 2,094,113 | Affel | Sept. 28, 1937 |
| 2,105,809 | Duncan, Jr. | Jan. 18, 1938 |
| 2,117,752 | Wrathall | May 17, 1938 |
| 2,129,020 | Murphy | Sept. 6, 1938 |
| 2,195,485 | Schulze-Herringen | Apr. 16, 1940 |
| 2,273,023 | de Bellescize | Feb. 17, 1942 |

FOREIGN PATENTS

| Number | Country | Date |
|---|---|---|
| 111,813 | Australia | Oct. 25, 1940 |
| 182,214 | Switzerland | Apr. 16, 1936 |
| 480,847 | Great Britain | Mar. 1, 1938 |